:::::::::::::::::::::::::::::::::::::::::::::::::::::::::::

3,277,162
WATER-SOLUBLE CONDENSATION PRODUCTS OF NAPHTHALENESULFONIC ACID AND FORMALDEHYDE
Robert Charles Johnson, Wilmington, Del., assignor to E. I. du Pont de Nemours and Company, Wilmington, Del., a corporation of Delaware
No Drawing. Filed Sept. 4, 1962, Ser. No. 221,358
6 Claims. (Cl. 260—505)

This invention relates to new water-soluble condensation products of naphthalenesulfonic acid and formaldehyde.

It has been known for many years that naphthalenesulfonic acid can be condensed with formaldehyde to form useful reaction products. For example, U.S. Patent 2,529,602 discloses a water-insoluble condensation product obtained by reacting 1 mol of naphthalenesulfonic acid with from 1 to 2.5 mols of formaldehyde. This water-insoluble produce is described as useful in ion exchange applications. It is also known that water-soluble condensation products can be formed by reacting formaldehyde and naphthalenesulfonic acid. In its initial stages, the reaction procedure for producing water-soluble materials is somewhat similar to the procedure used for producing water-insoluble products. In both instances, the reacting materials are condensed by heating at temperatures of about 80° C. However, in the case of the water-soluble product, the reaction period is shorter, water is added during the heating period, and the end product is usually recovered as a salt by neutralization of the condensation mass with a suitable alkali such as sodium hydroxide.

The present invention is concerned with water-soluble salts of the condensation product of formaldehyde and naphthalenesulfonic acid. In contrast to many water-soluble prior art products, the products of the present invention are prepared by using substantially larger quantities of formaldehyde per mol of naphthalenesulfonic acid. In addition to this, the products of this invention are reacted for longer periods of time so as to produce the condensation product with a higher degree of polymerization as represented by the viscosity of a water solution. It has been found that within certain limits of this viscosity range, a product is obtained possessing unique properties not found in prior art products.

More specifically, the products of this invention are obtained by reacting formaldehyde and naphthalenesulfonic acid in a mol ratio of 1 to 3 mols of formaldehyde per mol of the sulfonic acid. Reaction temperatures are maintained in the range of 60° C. to 100° C., and preferably 95° C. to 100° C. The reaction is carried out until the product as a water-soluble salt, such as the calcium salt, in a 12 wt. percent water solution at 25° C. has a relative viscosity of 1.5 centipoises to 10 centipoises. For most uses, a product having a relative viscosity of 1.5 to 1.9 centipoises gives the best results, while a product having a viscosity of 1.6 centipoises is most preferred.

If one is operating the reaction of this invention for the first time, it may be necessary to run the process in stages so that samples of the condensation product may be taken and converted to the salt, and the viscosity determined. However, after one skilled in the art becomes thoroughly familiar with a particular procedure according to this invention, the viscosity can be closely estimated by the time the reaction is run. The conversion of the condensation product to its salt for test purposes follows the same general procedure as is used in forming the final end product. In both cases, the condensation mass is neutralized to a pH of between 6.0 to 6.5 by the addition of alkali, preferably calcium oxide or calcium carbonate. The reaction product is then filtered, and the salt of the condensation product is recovered as a solid by evaporation of the water in the filtrate.

Naphthalenesulfonic acid, which is one of the starting materials, is usually produced by using an excess of sulfuric acid in the sulfonation reaction, and under such conditions sulfuric acid is present with the naphthalenesulfonic acid. Therefore, when the salt of the condensation product is formed by neutralization with the alkali, the sulfuric acid is also neutralized. In instances where the sulfate thus formed is water-soluble, such as in the case of ammonium, potassium and sodium sulfate, the by-product salt is found in the end product. For commercial use of the end-product, as disclosed later in the specification, the presence of the water-soluble salts has no effect upon the utility of the product. However, in making viscosity measurements for the purpose of determining whether or not a product has a viscosity within the limits of this invention, the water-soluble by-product sulfates should be removed. This can be accomplished by subsequently treating the neutralized reaction mass with lime (CaO). This results in the conversion of the sulfate ions to water-insoluble calcium sulfate which can be removed by filtration. Since the calcium salt of the condensation product is a preferred material, calcium carbonate is most frequently used as the neutralizing medium. When it is desired to form the sodium, potassium, or ammonium salts, neutralization can be carried out with such materials as the hydroxides, carbonates, and bicarbonates of sodium, potassium, or ammonia.

Naphthalenesulfonic acid is a well-known article of commerce. However, if desired, it can be prepared by those skilled in the art who practice this invention. To prepare naphthalenesulfonic acid, one mol of naphthalene is stirred with 1 to 1.5 mols of concentrated sulfuric acid, for example, 96% $H_2SO_4$, while heating to between 70° C. to 175° C. It is well known that the temperature of the reaction influences the ratio of 1- and 2-naphthalenesulfonic acids in the end product. At temperatures between 70° C. and 90° C., the naphthalenesulfonic acid comprises about 90% of 1-isomer and 10% of 2-isomer. At 110° C., about 75% of the 1-isomer is present and 25% of the 2-isomer; and at 140° C., the product is about 25% of 1-naphthalenesulfonic acid and 75% of 2-naphthalenesulfonic acid. The ratio of the two isomers in the naphthalenesulfonic acid is in no way critical to this invention. Either isomer or mixtures thereof can be used in this invention. A preferred product is the mixture obtained by reacting naphthalene and sulfuric acid at from 150° to 155° C.; it is approximately 85% of 2-isomer and 15% of 1-isomer.

Formaldehyde, the other starting material used in this invention, is, of course, a well-known chemical compound, and it is generally available as a water solution, usually in a concentration of 30% to 40% by weight. Such water solutions are preferred to produce the products of this invention. However, other sources of formaldehyde are also within the scope of this invention. These include paraformaldehyde and trioxane in the form of aqueous solutions, preferably solutions containing 30 to 40 wt. percent based on the available formaldehyde. Paraformaldehyde is a mixture of glycols having the formula $HO(CH_2O)_nH$ where $n$ varies from about 8 to 100. It dissolves in water with depolymerization and hydration to yield a solution of formaldehyde. Trioxane in aqueous solution in the presence of a strong acid such as the sulfuric acid used for sulfonating naphthalene is also depolymerized to provide formaldehyde.

The novel condensation products of this invention are useful as surface-active agents and as dye retardants in the dyeing of polyacrylic fibers.

The invention products also possess a valuable property whereby they act as water-loss additives for cements used in oil well drilling. A product of this invention is added to the dry cement or to a slurry of the cement or to water with which the cement slurry is to be made, in an amount of 0.5% to 2% by weight based upon the dry cement. It acts to reduce the water loss from the cement slurry, particularly when the cement is under pressure and in contact with porous materials. Thus, these naphthalenesulfonic acid-formaldehyde condensation products prevent the water in the cement slurry from filtering into permeable underground formations before it has had a chance to set properly.

For a clearer understanding of the invention, the following specific examples are given. These examples are intended to be merely illustrative of the invention, and not in limitation thereof. Unless otherwise specified, all parts and percentages in this specification are by weight.

Example I

*Part A.*—Naphthalene (128 parts, representing 1 mol) is sulfonated at 150° C. to 155° C. with 96% sulfuric acid (130 parts, representing 1.28 mols). The sulfonation product comprises about 85% of 2-naphthalenesulfonic acid and 15% of 1-naphthalenesulfonic acid. The reaction mass is cooled to about 90° C. with the simultaneous addition of 65 parts of water. Now 37% aqueous formaldehyde solution (97.5 parts of solution, which is equivalent to 1.2 mols of 100% material) is added gradually to the naphthalenesulfonic acid mixture, keeping the temperature between 90° and 95° C. The temperature is then raised to between 98° and 100° C. and held for 42 hours. During the reaction, the viscosity of the condensation mass increases and it is necessary to add water from time to time to thin the mass for efficient agitation. A total of four 25-part portions of water (100 parts in all) is added. At the end of the heating period, a sample portion of the reaction mass is neutralized with calcium carbonate, filtered, diluted to a 12% solution at 25° C., and found to have a relative viscosity, i.e., viscosity of the solution divided by the viscosity of water at 25° C., of 1.6 centipoises.

The whole reaction mass is then drowned in 350 parts of water and heated to 75° C. Pulverulent calcium carbonate is then added to neutralize the naphthalenesulfonic acid-formaldehyde condensation product to pH 6.5. At the same time calcium sulfate, formed by reaction with the excess sulfuric acid present, precipitates. The calcium sulfate is removed by filtration, and the calcium salt of the naphthalenesulfonic acid-formaldehyde condensation product is isolated as an amorphous, tan, granular solid by drum drying. With grinding, a finely divided tan powder is obtained as the final end product. This product is an effective low water-loss additive for Portland cement and a dye retardant in dyeing polyacrylic fiber with a cationic dye. It is also a good emulsifying agent for the preparation of oil-water type emulsions.

*Part B.*—The condensation procedure of Part A is carried out three times to produce three separate condensation masses. All are neutralized to a pH of 6.5 but with different neutralizing agents. One is neutralized with sodium hydroxide, another with potassium carbonate, and still another with ammonium hydroxide. Each of the sodium, potassium, and ammonium salts of the condensation product thus formed, together with the sulfuric acid salt formed from the excess sulfuric acid used in the sulfonation of the naphthalene, is an effective water-loss additive for Portland cement slurries. Each of these salts is also a dye retardant when added to a cationic dye bath in dyeing polyacrylic fiber. Portions of each of the condensation product solutions neutralized with the three different alkaline materials are treated with lime and filtered, thus removing the water-soluble by-product sulfate. The resultant solutions diluted to 12% concentration are found to have a relative viscosity at 25° C. of 1.6 centipoises.

*Part C.*—When the sulfonation is carried out at 50° to 55° C., the product consists essentially of 1-naphthalenesulfonic acid. The 1-isomer requires a shorter reaction time to produce the condensation product. Therefore, 1 mol of this 1-naphthalenesulfonic acid is heated with 1.2 mols of formaldehyde for 22 hours at 98° to 100° C. and the reaction mass neutralized to a pH of 6.5 with calcium carbonate as described above to yield a calcium salt of the condensation product having in a 12% water solution at 25° C. a relative viscosity of 1.6 centipoises. The isolated dry product is an excellent water-loss additive for Portland cement, and it is also a good dye retardant in the dyeing of polyacrylic fiber.

Example II 128 parts of naphthalenesulfonic acid which is substantially 2-naphthalenesulfonic acid is condensed with 3 mols of formaldehyde per mol of naphthalenesulfonic acid employing 243 parts of 37% aqueous formaldehyde solution. The condensation is conducted at 98° to 100° C. for 68 hours, with incremental additions of water to keep the reaction mass from becoming too thick to agitate. A sample of the reaction mass, neutralized with calcium carbonate, filtered, and diluted to a 12% solution, has a relative viscosity of 6.1 centipoises.

The whole reaction mass is now diluted with 350 parts of hot water with adjustment of the temperature to 75° C. Lime is added to neutralize the charge to pH 6.5. The condensation product is converted to the water-soluble calcium salt, and the excess sulfuric acid from the sulfonation reaction is precipitated as calcium sulfate. The mass is filtered (to remove the calcium sulfate) and the filtrate drum dried to isolate the calcium salt as an amorphous, tan granular solid. This solid is ground to a fine powder which is the final end product.

The product is a water-loss additive in admixture with sodium carbonate and borax for slow setting oil well cements, and retards the dyeing rate of cationic dyes applied to polyacrylic fiber to produce attractive level dyeings.

While the molar ratio of formaldehyde to naphthalenesulfonic acid used for the condensation may vary from 1 to 3 mols of formaldehyde per mol of acid, the preferred ratio is 1.2 mols of formaldehyde per mol of acid. As previously mentioned, the preferred reaction temperature is 95° to 100° C., which is convenient particularly at atmospheric pressure and provides a suitable reaction rate. Higher temperatures result in loss of formaldehyde unless pressure equipment is used. Lower temperatures are applicable, but longer times are required to reach the desired end product.

The time of reaction to yield a condensation product whose calcium salt (or sodium, potassium, or ammonium salt separated from other electrolytes such as sulfate) in a 12% water solution at 25° C. has a relative viscosity between 1.5 and 10 centipoises is dependent upon not only the temperature of the condensation but on the isomer of naphthalenesulfonic acid employed, the molar ratio of formaldehyde to naphthalenesulfonic acid, and the dilution of the reaction mass with water. 1-naphthalenesulfonic acid reacts with formaldehyde (to give the product with the desired degree of polymerization as represented by the defined limits of viscosity of the water solution) in shorter time than 2-naphthalenesulfonic acid. For example, the 1-isomer reacts with 1.2 mols of formaldehyde per mol of the acid at 98° to 100° C. in 20 hours to 24 hours, while the 2-isomer requires 40 hours to 44 hours to attain the same viscosity level under the same reaction conditions. The reaction rate increases as the molar ratio of formaldehyde to naphthalenesulfonic acid increases. When the increase in amount of formaldehyde is obtained with an aqueous solution of fixed concentration, the dilution effect of the increased amount of water has a retarding effect and offsets somewhat the effect of the increased formaldehyde. In carrying out the condensation, incremental additions of water are made in any amount sufficient to keep the mass stirrable. This addition of water prevents the condensation from being baked to a water-insoluble type condensation product. As an alternative to isolating the product by drum drying, the solution may be dried by spraying and by evaporation.

The products of this invention have a degree of polymerization not previously found in naphthalenesulfonic acid-formaldehyde condensation products, and it is this polymerization that gives the products their unique properties. The most convenient method for determining whether or not the products possess this polymerization is the viscosity measurement described earlier in this specification; therefore, any reference to viscosity in the specification or claims is meant to refer to the viscosity of a 12% by weight water solution at 25° C.

The unique properties of the condensation products are particularly apparent when they are used as water-loss additives in oil well drilling cements. The American Petroleum Institute (API) has established a filter-loss test which can be used to determine the effectiveness of these materials as water-loss additives. This test is described in the American Petroleum Institute Recommended Practice 10B dated January 1960. When 2% (by weight, based on dry cement) of the product of Example I, Part A, is added to a Portland cement slurry which has been prepared in accordance with the API Recommended Practice, the water loss is only 10 ml. per 30 minutes at 25° C. and 100 p.s.i.g. The same slurry without the product of this invention lost water at the rate of 500 ml. in 30 minutes at the same temperature and pressure, and under the same conditions the cement slurry lost water at the rate of 275 ml. in 30 minutes when a condensation product having a viscosity of only 1.3 centipoises was used. Thus, the product of Example I-A effected a 50-fold reduction in water loss in a cement slurry, as compared to a slurry which does not contain this product. Moreover, the product of this invention shows better than a 25-fold improvement as a water-loss additive as compared to a condensation product having a viscosity of only 1.3 centipoises.

For the production of slow-setting cements of the type used in deep oil wells where conditions of high temperature and pressure cause regular cements to set too quickly, the naphthalenesulfonic acid-formaldehyde condensation product is combined with sodium carbonate ($Na_2CO_3$) and borax ($Na_2B_4O_7 \cdot 10H_2O$) to provide an effective water-loss additive. The composition of such an additive may comprise about 50% to 75% of the invention condensation product, about 1% to 10% of sodium carbonate, and about 20% to 49% of borax. A preferred mixture contains about 71% of the condensation product, about 4% of sodium carbonate, and about 25% of borax. From 0.5% to 3% by weight of this mixture on the basis of the dry cement is added to the dry cement, to the slurry of the cement in water, or to the water with which the cement slurry is made. The effectiveness of this additive composition is shown by the above filter loss test wherein the untreated slurry of slow setting cement at 80° C. and under 100 p.s.i.g. pressure gives up water at the rate of 650 ml. per 30 minutes, while the same slurry treated with 1.5% by weight of the composition based on the dry cement content of the slurry loses water at the rate of only 10 ml. per 30 minutes. It should be pointed out that the results of these tests have been sustained in actual oil well drilling operations.

It has also been previously mentioned in the specification that the naphthalenesulfonic acid-formaldehyde condensation products of this invention are useful as dye retardants when dyeing polyacrylic fibres with cationic dyes. The condensation product reacts with the dye to form insoluble, organic, sulfonate salts which can be kept dispersed in the dye bath with a non-ionic surface-active agent such as the condensation product of 20 mols of ethylene oxide and 1 mol of 9-octadecen-1-ol. During the dyeing the fiber, the small amount of dye in solution in equilibrium with the insoluble salt is taken up by the fiber. To reestablish the equilibrium, more of the salt dissociates to provide more free dye which is in turn gradually absorbed in dyeing the fiber. Such a mechanism results in a retarded, controlled rate of even dyeing. For this reason, retardants are often used in the dyeing of polyacrylic fibers to obtain level dyeing. The naphthalenesulfonic acid - formaldehyde condensation product per se is an excellent dye retardant, and it may be incorporated into the dye bath in an amount of approximately 0.4% to 1.5% by weight based on the weight of the fiber. When using the product of this invention as a dye retardant, a surface-active agent should be used to keep the insoluble dye salt dispersed. The previously mentioned condensation product of 20 mols of ethylene oxide and 1 mol of 9-octadecen-1-ol can be used for this purpose in an amount of 0.2 part to 1.0 part per part of dye retardant.

The naphthalenesulfonic acid-formaldehyde condensation product may also be used as a dye retardant in conjunction with borax and sodium carbonate in the same proportions as are used in the water loss additive previously described.

As illustrative of the use of these materials as dye retardants, each of the following materials was incorporated in the dye bath described below in an amount of 1.25 parts:

*Material A.*—Product of Example I—Part A.
*Material B.*—A composition comprising

| | Percent |
|---|---|
| Product of Example I—Part A | 71 |
| Sodium carbonate | 4 |
| Borax | 25 |

*Material C.*—Prior art condensation product of naphthalenesulfonic acid and formaldehyde having a relative viscosity of 1.3 centipoises.

The dye bath comprised:
1 part bluish-red dye having the formula:

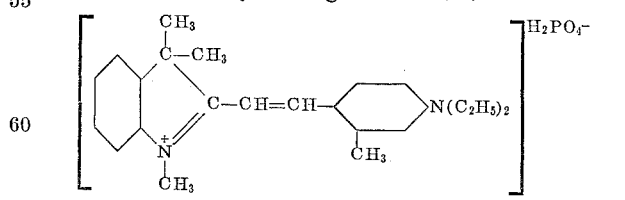

10 parts anhydrous sodium sulfate
0.25 part condensation product of ethylene oxide and 9-octadecen-1-ol
Water to give total of 4000 parts
Glacial acetic acid to adjust dye bath containing dye retardant agent to pH 5.

This dyebath was used to dye 100 parts of acid-modified polyacrylic fiber. By acid-modified fiber is meant the sulfonate-modified acrylic fiber described in U.S. Patent 2,837,500 and 2,837,501. The dyeing procedure consisted of prescouring 100 parts of the acrylic fiber as a woven fabric for 15 minutes at 70° C. in 4000 parts of water containing 1 part of the above-mentioned ethylene oxide condensation product, rinsing the fabric, and placing it in the dyebath maintained at 97° C. Dyebath aliquots were taken at 15, 30, 60, 90, and 120 minute intervals and the dye content measured spectrophotometrically to determine the rate of dyeing and extent of exhaustion. The extent of exhaustion is given in the table below.

| Retardant Used | Percent Exhaustion of Dyebath, after Lapse of— | | | | |
|---|---|---|---|---|---|
| | 15 min. | 30 min. | 60 min. | 90 min. | 120 min. |
| Material A | 54 | 70 | 82 | 87 | 90 |
| Material B | 58 | 74 | 86 | 90 | 93 |
| Material C | 73 | 84 | 91 | 94 | 96 |

A comparison of the exhaustions of the dye from the three baths shows that the invention compositions (Materials A and B) significantly retard the dyeing rate, and as a result there is a corresponding improvement in the level of dyeing. On the other hand, there is also a good utilization of the dye as evidenced by the high percentage of exhaustion of the dyebath at the later stage of the dyeing operation.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. The water-soluble salt of the condensation product of napthalenesulfonic acid and formaldehyde, the cation of said salt being selected from the group consisting of sodium, potassium, calcium, and ammonium ions, said condensation product being formed by condensing 1 mol of naphthalenesulfonic acid with 1 to 3 mols of formaldehyde while periodically adding enough water to keep the mass stirrable, said condensation and said water additions being continued until the condensation product in the form of the salt exhibits a viscosity of 1.5 to 10 centipoises in a 12 wt. percent water solution at 25° C.

2. The water-soluble salt of claim 1 in which the cation is sodium.

3. The water-soluble salt of claim 1 in which the cation is potassium.

4. The water-soluble salt of claim 1 in which the cation is ammonium.

5. The water-soluble salt of claim 1 in which the cation is calcium.

6. The water-soluble calcium salt of the condensation product of naphthalenesulfonic acid and formaldehyde, said condensation product being formed by condensing 1 mol of naphthalenesulfonic acid with 1.2 mols of formaldehyde while periodically adding enough water to keep the mass stirrable, said condensation and said water additions being continued until the condensation product in the form of the calcium salt exhibits a viscosity of 1.6 centipoises in a 12 wt. percent water solution at 25° C.

References Cited by the Examiner

UNITED STATES PATENTS

| 1,216,612 | 2/1917 | Schmidt | 260—505 |
| 1,278,229 | 9/1918 | Schmidt | 260—505 |
| 1,336,759 | 4/1920 | Schmidt | 260—505 |
| 2,199,806 | 5/1940 | Michell | 260—505 |
| 2,646,360 | 7/1953 | Lea | 106—90 |
| 2,927,033 | 3/1960 | Benedict et al. | 106—90 |
| 3,067,243 | 12/1962 | Richter et al. | 260—505 |

LORRAINE A. WEINBERGER, *Primary Examiner.*

JULIUS GREENWALD, *Examiner.*

H. B. GUYNN, B. EISEN, M. WEBSTER,
*Assistant Examiners.*